(12) United States Patent
Lahav et al.

(10) Patent No.: US 12,305,794 B2
(45) Date of Patent: May 20, 2025

(54) TWO-AXIS MOTOR-DRIVEN SPHERICAL ORIENTING MECHANISM

(71) Applicant: RAFAEL ADVANCED DEFENSE SYSTEMS LTD., Haifa (IL)

(72) Inventors: Oded Lahav, Atzmon (IL); Omri Zvi Shacham, Manoff (IL); Leonid Fraiman, Karmiel (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 18/568,889

(22) PCT Filed: Mar. 28, 2022

(86) PCT No.: PCT/IB2022/052843
§ 371 (c)(1),
(2) Date: Dec. 11, 2023

(87) PCT Pub. No.: WO2023/002259
PCT Pub. Date: Jan. 26, 2023

(65) Prior Publication Data
US 2024/0271742 A1      Aug. 15, 2024

(30) Foreign Application Priority Data

Jul. 21, 2021   (IL) .......................................... 285055

(51) Int. Cl.
| | |
|---|---|
| *F16M 11/14* | (2006.01) |
| *F16C 19/18* | (2006.01) |
| *F16M 11/18* | (2006.01) |
| *G02B 27/64* | (2006.01) |

(52) U.S. Cl.
CPC ............. *F16M 11/14* (2013.01); *F16C 19/18* (2013.01); *F16M 11/18* (2013.01); *G02B 27/64* (2013.01)

(58) Field of Classification Search
CPC ........ F16M 11/12; F16M 11/14; F16M 11/18; F16M 11/121; G02B 27/64; F16C 19/18
USPC ..................................................... 248/284.1
See application file for complete search history.

(56) References Cited

U.S. PATENT DOCUMENTS

| | | | |
|---|---|---|---|
| 10,501,204 B2 * | 12/2019 | Kang ..................... | G03B 17/56 |
| 10,976,647 B2 * | 4/2021 | Liao ....................... | G03B 17/12 |
| 2004/0173726 A1 * | 9/2004 | Mercadal ............... | G01C 21/18 |
| | | | 248/660 |

* cited by examiner

*Primary Examiner* — Todd M Epps
(74) *Attorney, Agent, or Firm* — Rivka Friedman

(57) ABSTRACT

A mechanism for orienting a payload support includes first and second transversely deployed drive assemblies, each having a motor that drives a drive arm. The payload support is directly pivotally mounted to a first drive arm. Connection between the second drive arm and the payload support is via a coupling linked to the second drive arm via a coupling rotary joint, and to the payload support via a support rotary joint. Both the first drive arm and the second drive arm are supported relative to the frame by sets of two bearing assemblies located on opposite sides of the center of rotation. Each of the bearing assemblies is preferably implemented as a loaded duplex bearing assembly, and most preferably with a back-to-back loaded duplex bearing assembly on each axis.

14 Claims, 8 Drawing Sheets

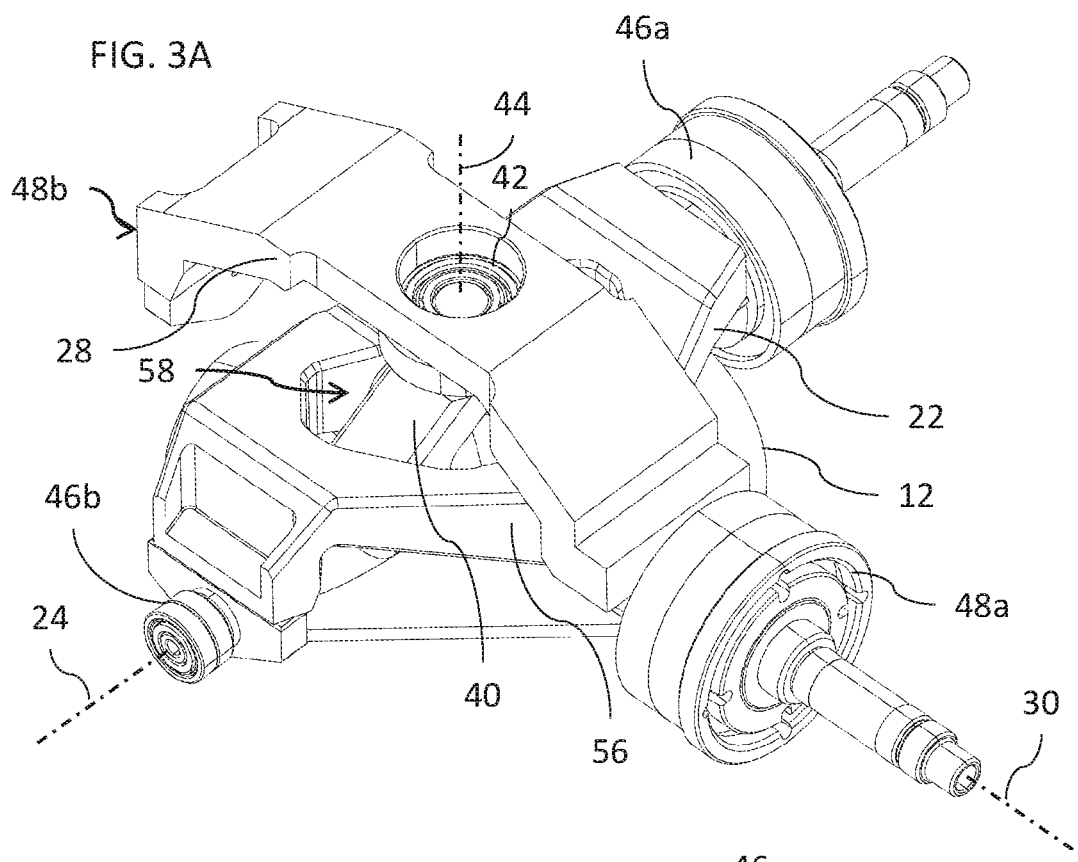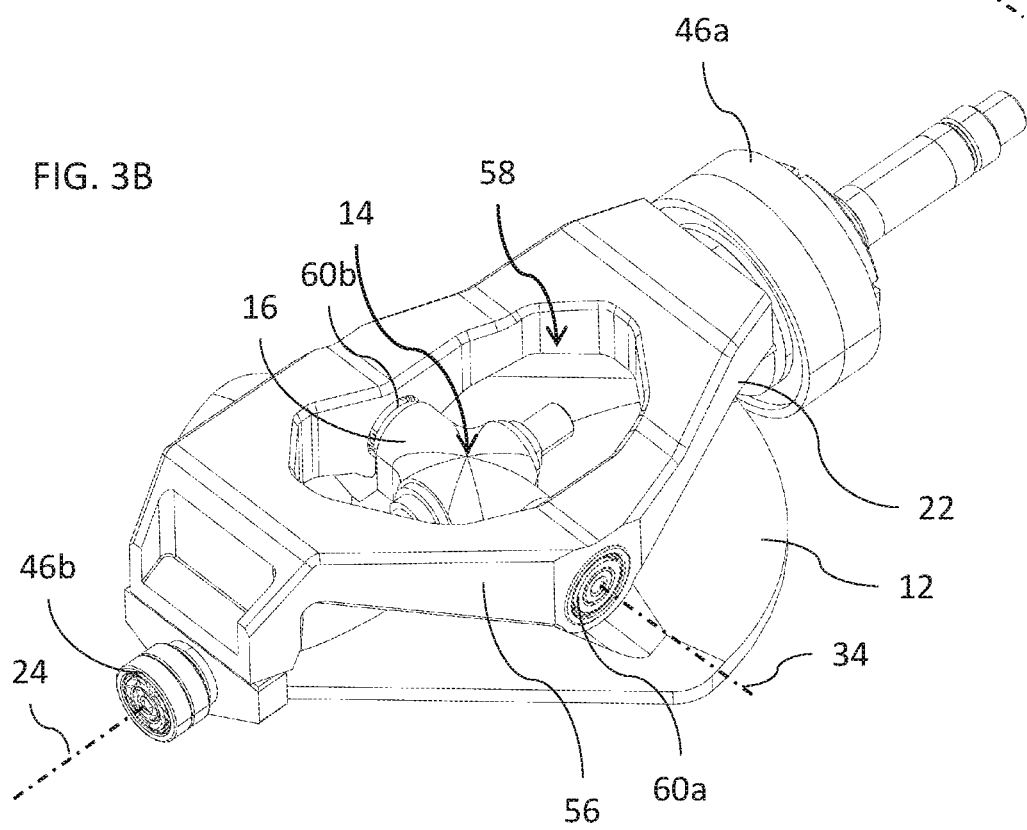

TWO-AXIS MOTOR-DRIVEN SPHERICAL ORIENTING MECHANISM

FIELD AND BACKGROUND OF THE INVENTION

The present invention relates to mechanisms for orienting a payload and, in particular, it concerns a two-axis motor-driven orienting mechanism.

Two-axis spherical orienting devices, which orient a payload towards a desired direction in space by rotating it around a fixed point, are used in many fields of technology. Of particular interest in the context of the present invention are applications in which the orientation of an optical payload, such as a lens or mirror, needs to be controlled about two axes.

A conventional mechanism for the tilting of an orientable device into two directions is an assembly of two gimbals, i.e., pivoted supports that each allow the rotation of a device about a single axis, wherein one inner gimbal is mounted on an outer gimbal with orthogonal pivot axes. However, in order to actuate the inner gimbal, an actuating motor has to be carried and displaced by the outer gimbal. This leads to an increase in the moment of inertia against which the outer gimbal operates, limiting the mechanism's ability to perform rapid movements.

U.S. Pat. No. 5,966,991 discloses a two degree-of-freedom spherical orienting device in which a "spherical five-bar mechanism" supporting a payload is actuated by two rotary actuators which are in fixed positions relative to a base.

SUMMARY OF THE INVENTION

The present invention is a spherical orienting mechanism for orienting a payload about two axes.

According to the teachings of an embodiment of the present invention there is provided, a spherical orienting mechanism for orienting a payload relative to two axes of rotation about a center of rotation, the mechanism comprising: (a) a payload support located at the center of rotation; (b) a frame at least partially encompassing the payload support; (c) a first drive assembly comprising: (i) a first motor deployed in fixed relation to the frame, and (ii) a first drive arm deployed so as to be driven by the first motor to rotate about a first drive axis aligned with the center of rotation, the payload support being supported relative to the first drive arm by a first support rotary joint, the first support rotary joint defining a first support rotation axis that is transverse to the first drive axis and aligned with the center of rotation; (d) a second drive assembly comprising: (i) a second motor deployed in fixed relation to the frame, and (ii) a second drive arm deployed so as to be driven by the second motor to rotate about a second drive axis, transverse to the first drive axis and aligned with the center of rotation, the second drive arm being linked to the payload support by a coupling linked to the second drive arm via a coupling rotary joint and to the payload support via a second support rotary joint, the coupling rotary joint defining a coupling rotation axis that is transverse to the second drive axis and aligned with the center of rotation, the second support rotary joint defining a second support rotation axis that is transverse to the coupling rotation axis and to the first support rotation axis, wherein the first drive arm is supported relative to the frame for rotation about the first drive axis by a first set of two bearing assemblies located on opposite sides of the center of rotation, and wherein the second drive arm is supported relative to the frame for rotation about the second drive axis by a second set of two bearing assemblies located on opposite sides of the center of rotation.

According to a further feature of an embodiment of the present invention, the first frame is a closed frame encompassing the payload support.

According to a further feature of an embodiment of the present invention, the bearing assemblies of the first and second sets of bearing assemblies are implemented as loaded duplex bearing assemblies.

According to a further feature of an embodiment of the present invention, at least one of the first set of two bearing assemblies is a back-to-back loaded duplex bearing assembly, and at least one of the second set of two bearing assemblies is a back-to-back loaded duplex bearing assembly.

According to a further feature of an embodiment of the present invention, one of the first set of two bearing assemblies is a back-to-back loaded duplex bearing assembly and another of the first set of two bearing assemblies is a face-to-face loaded duplex bearing assembly, and wherein one of the second set of two bearing assemblies is a back-to-back loaded duplex bearing assembly and another of the second set of two bearing assemblies is a face-to-face loaded duplex bearing assembly.

According to a further feature of an embodiment of the present invention, the first drive arm has a bifurcated medial portion defining a medial opening, and wherein the first support rotary joint comprises a third set of two bearing assemblies located on opposite sides of the center of rotation supporting the payload support bilaterally from the bifurcated medial portion of the first drive arm.

According to a further feature of an embodiment of the present invention, the coupling extends from the second drive arm through the medial opening in the first drive arm.

According to a further feature of an embodiment of the present invention, an end portion of the coupling is bifurcated, and wherein the second support rotary joint comprises a fourth set of two bearing assemblies located on opposite sides of the center of rotation supporting the payload support bilaterally from the bifurcated end portion of the coupling.

According to a further feature of an embodiment of the present invention, the bearing assemblies of the third and fourth sets of bearing assemblies are implemented as loaded duplex bearing assemblies.

According to a further feature of an embodiment of the present invention, the coupling rotary joint is configured to provide adjustability of an axial position of the coupling along the coupling rotation axis.

BRIEF DESCRIPTION OF THE DRAWINGS

The invention is herein described, by way of example only, with reference to the accompanying drawings, wherein:

FIGS. 3A-3D are lower isometric views similar to FIG. 1B showing various selected components and their interconnections with the payload support of FIG. 2;

DESCRIPTION OF THE PREFERRED EMBODIMENTS

Figure 1A:
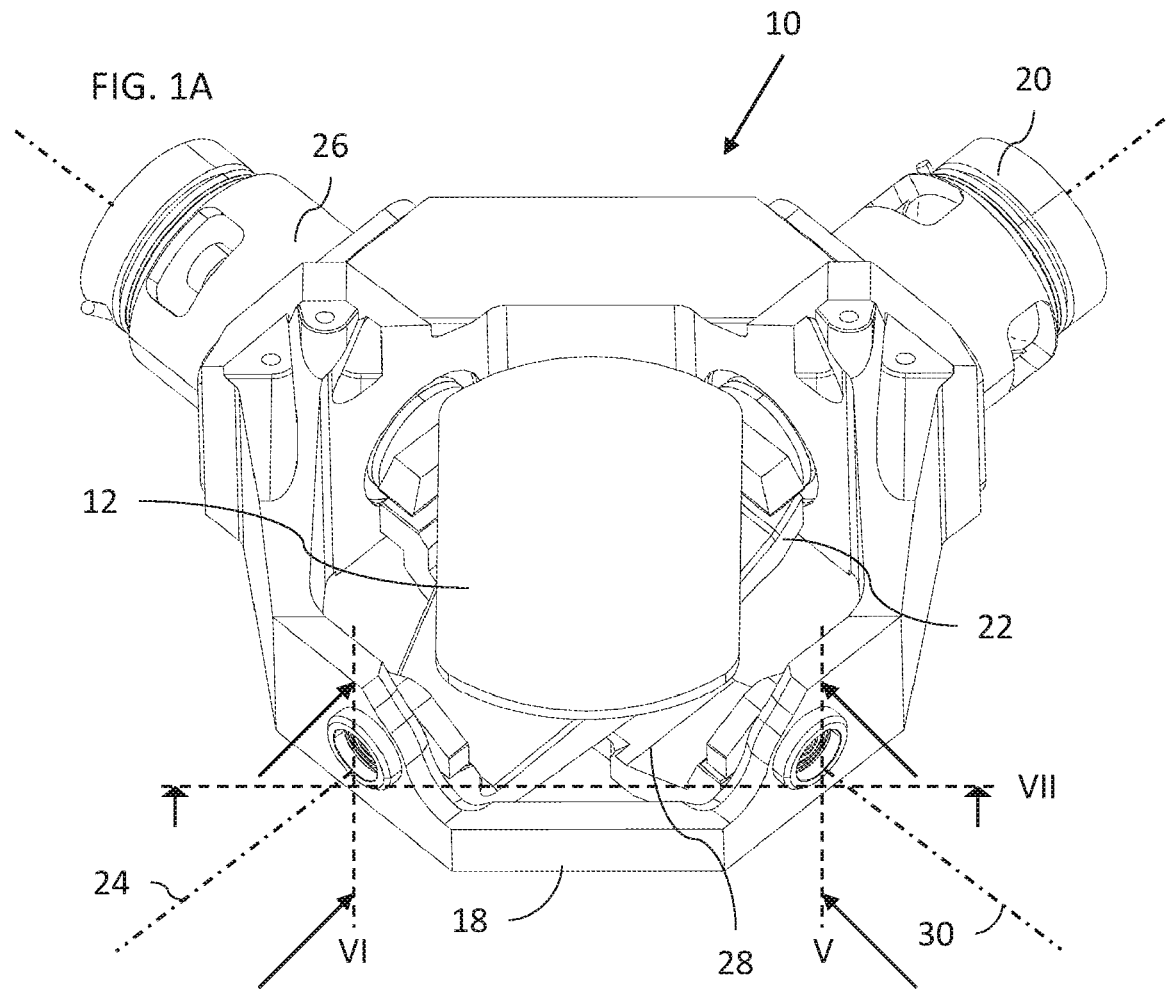
FIGS. 1A-1C are upper and lower isometric views, and a bottom view, of an orienting mechanism, constructed and operative according to the teachings of an embodiment of the present invention.

The present invention is a spherical orienting mechanism for orienting a payload about two axes.

The principles and operation of orienting mechanisms according to the present invention may be better understood with reference to the drawings and the accompanying description.

Referring now to the drawings, FIGS. 1A-7 are various full and partial views of a spherical orienting mechanism, generally designated 10 for orienting a payload 12 relative to two axes of rotation about a center of rotation 14. In the non-limiting example illustrated throughout the drawings, the payload is an optical mirror, which may be used to control the line of sight of an optical device (not shown), which may be, for example, a scanning imaging system or an active laser. Although illustrated in this context, the payload may be any type of payload for which an orienting mechanism is needed.

Mechanism 10 includes a payload support 16 located at the center of rotation 14. The payload support may be a distinct support platform which support the payload, or may be integrated with the payload as illustrated here. A frame 18 at least partially encompasses payload support 16, and is most preferably implemented as a closed frame encompassing payload support 16, thereby providing enhanced rigidity to the mechanism. The terminology of a "closed frame" and "encompassing" are used according to their normal meanings, and refer to a structure which extends continuously around the payload support, in some cases such that the frame defines a continuous frame around the payload support in at least one plane, and typically in a plane that is roughly orthogonal to a neutral facing direction of the payload (e.g., a vector normal to the mirror surface). The continuity of a closed frame is valuable for the additional rigidity that it provides compared to an open frame, but it will be understood that such rigidity can be provided even if the closure is not continuous in a single plane.

In order to align the payload support about two axes, mechanism 10 includes a first drive assembly including a first motor 20 deployed in fixed relation to frame 18, and a first drive arm 22 deployed so as to be driven by first motor 20 to rotate about a first drive axis 24 aligned with the center of rotation 14, and a second drive assembly including a second motor 26 deployed in fixed relation to frame 18 and a second drive arm 28 deployed so as to be driven by second motor 26 to rotate about a second drive axis 30. The second drive axis 30 is transverse, and preferably perpendicular, to first drive axis 24 and aligned with the center of rotation 14.

The connection of the payload support 16 to the first and second drive arms 22 and 28 will be best understood with reference to FIG. 2 and FIGS. 3A-3D, which show selected elements in isolation in order to reveal the mechanical relation between them.

Figure 2:
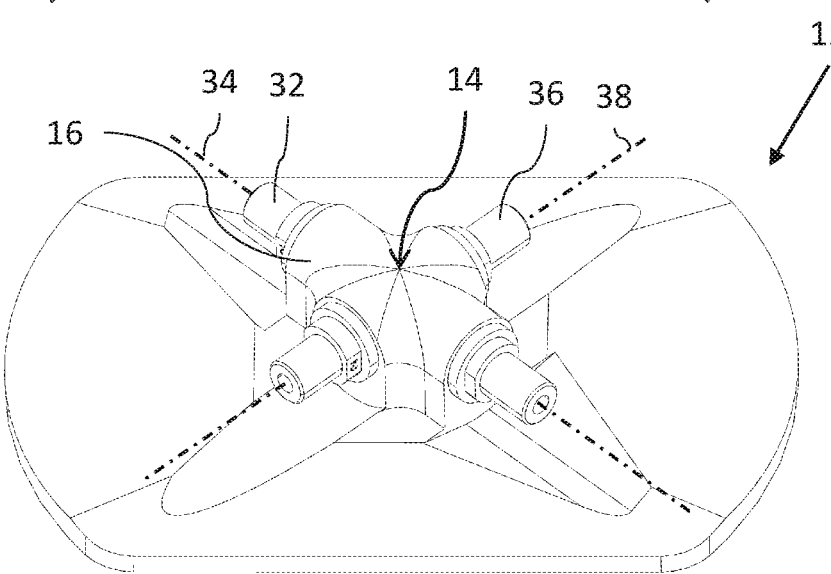
FIG. 2 is a lower isometric view of a payload and payload support from the orienting mechanism of FIG. 1A.
Figure 1B:
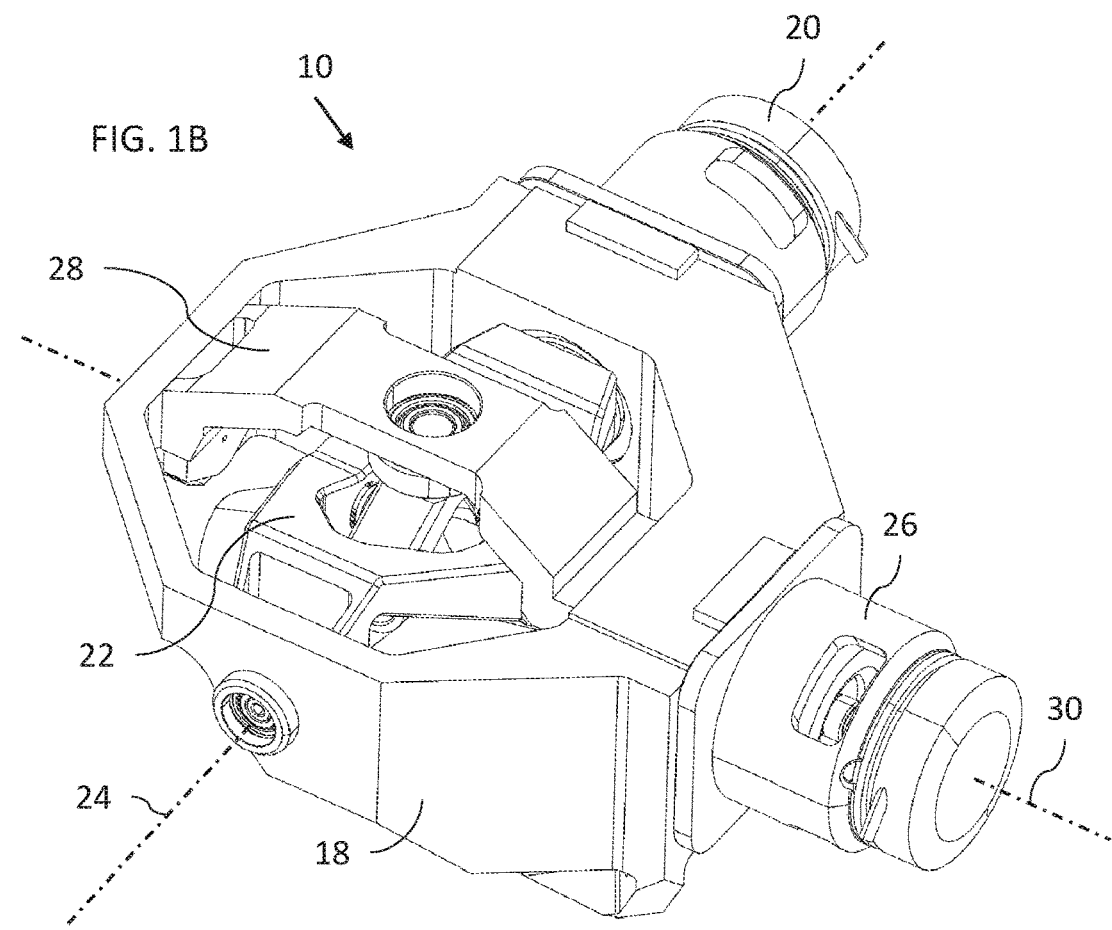
Figure 1C:
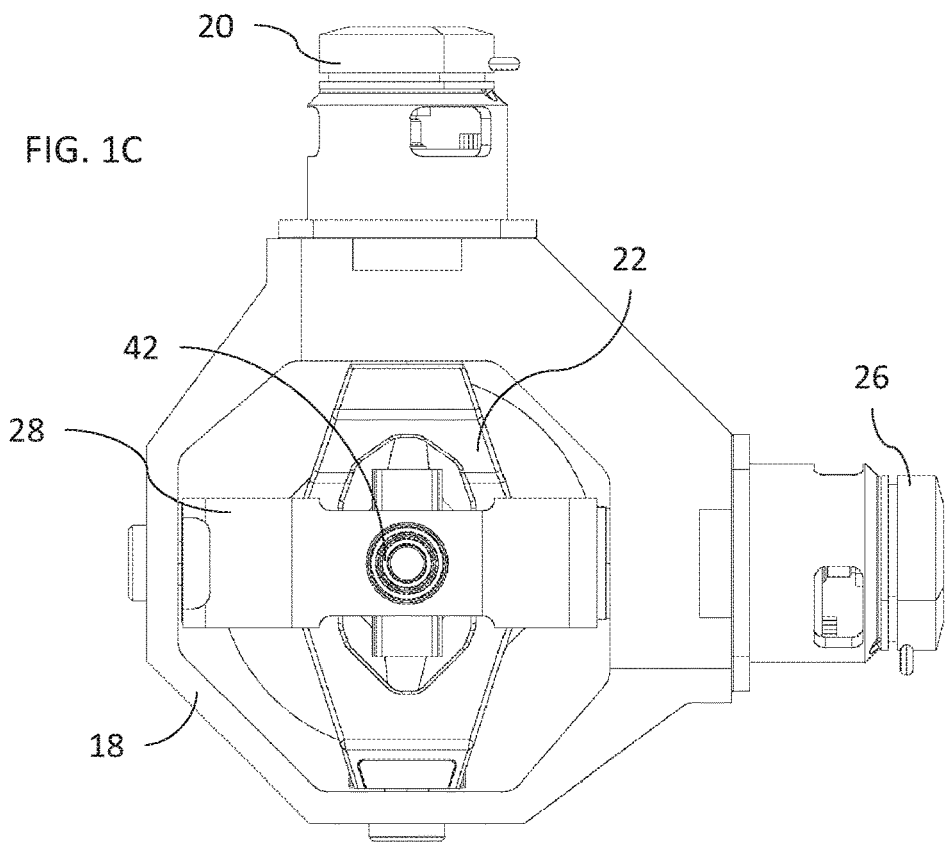

Referring first to FIG. 2, this shows the payload support 16 with associated axles 32 defining a first support rotation axis 34 and axles 36 defining a second support rotation axis 38. As best seen in FIG. 3B, payload support 16 is directly supported relative to first drive arm 22 by a first support rotary joint that is freely rotatable about first support rotation axis 34, so that first support rotation axis 34 is transverse, and preferably perpendicular, to first drive axis 24 and aligned with the center of rotation 14. In this manner, rotation of first drive arm 22 directly controls tilt of payload support 16 (and hence mirror 12) about axis 24 while leaving payload support 16 free to tilt about first support rotation axis 34 under control of the second drive assembly.

Figure 3C:
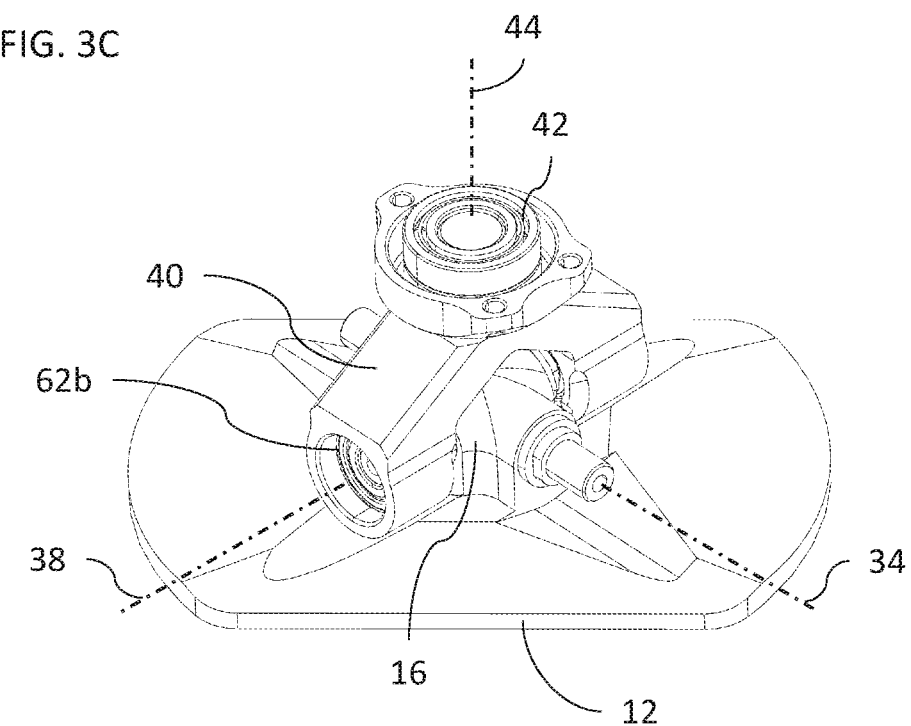
Figure 3D:
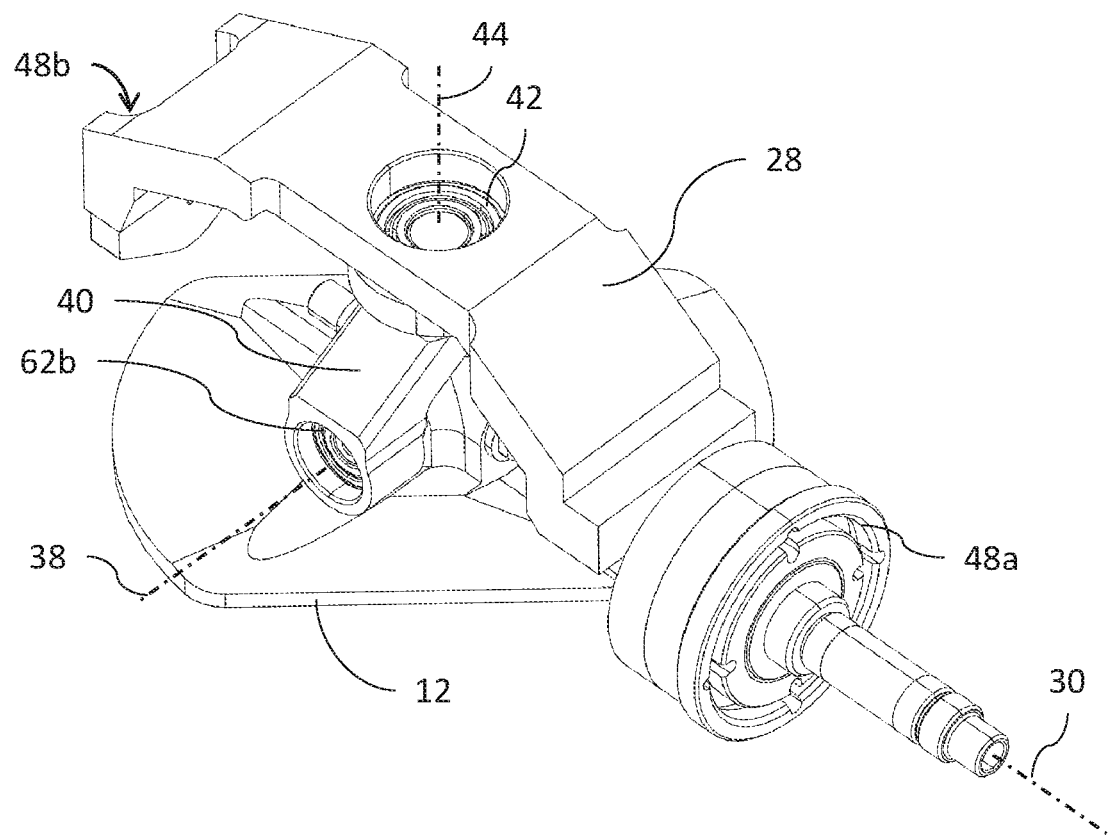

Second drive arm 28 is linked to payload support 16 by a coupling 40 linked to second drive arm 28 via a coupling rotary joint 42 and to payload support 16 via a second support rotary joint. The coupling rotary joint 42 defines a coupling rotation axis 44 that is transverse, and preferably perpendicular, to the second drive axis 30 and aligned with center of rotation 14. The second support rotary joint is rotatable about second support rotation axis 38 that is transverse, and preferably perpendicular, to coupling rotation axis 44 and to the first support rotation axis 34. These features are best seen in FIG. 3C, where both drive arms are removed to reveal the structure of coupling 40, and FIG. 3D, which shows the assembly associated with second drive arm 28 while omitting first drive arm 22 for clarity. It will be noted that rotation of second drive arm 28 actuates motion of coupling 40 and thereby tilts payload support 16 about first support rotation axis 34 (the position of which is defined by the position of first drive arm 22, as described above). Coupling rotary joint 42 provides the extra degree of freedom required to accommodate the combination of rotations. The overall arrangement of both drive arms is shown in FIG. 3A.

The term "transverse" as used herein refers to axes which are sufficiently angularly spaced as to allow a combination of rotations about those axes to achieve the entire range of required orientations. In most cases, axes that are transverse to each other are at angles of between 70-110 degrees, more preferably between 80-100 degrees, and most preferably within 5 degrees of perpendicular. In a particularly preferred example of the present invention, the first and second drive axes 24 and 30 are perpendicular, and the first and second support rotation axes 34 and 38 are perpendicular.

Certain applications of the orienting mechanism of the present invention impose challenging performance demands on the mechanism. In particular, certain applications require high precision and repeatability of motion during a rapid stepped-scanning motion, and/or insensitivity to external vibrations, impacts and acceleration. It is a particular feature of certain particularly preferred embodiments of the present invention that the orienting mechanism is implemented with various features which contribute to one or more of the desired mechanical properties.

Thus, according to one aspect of certain particularly preferred embodiments of the present invention, first drive arm 22 is supported relative to frame 18 for rotation about first drive axis 24 by a first set of two bearing assemblies 46a and 46b located on opposite sides of the center of rotation 14, and second drive arm 28 is supported relative to frame 18 for rotation about second drive axis 30 by a second set of two bearing assemblies 48a and 48b located on opposite sides of center of rotation 14. By providing support for both drive arms at both ends, the frequencies of vibrational modes of the mechanism are greatly increased, thereby providing greatly enhanced rigidity and stability under conditions of vibration.

Figure 4A:
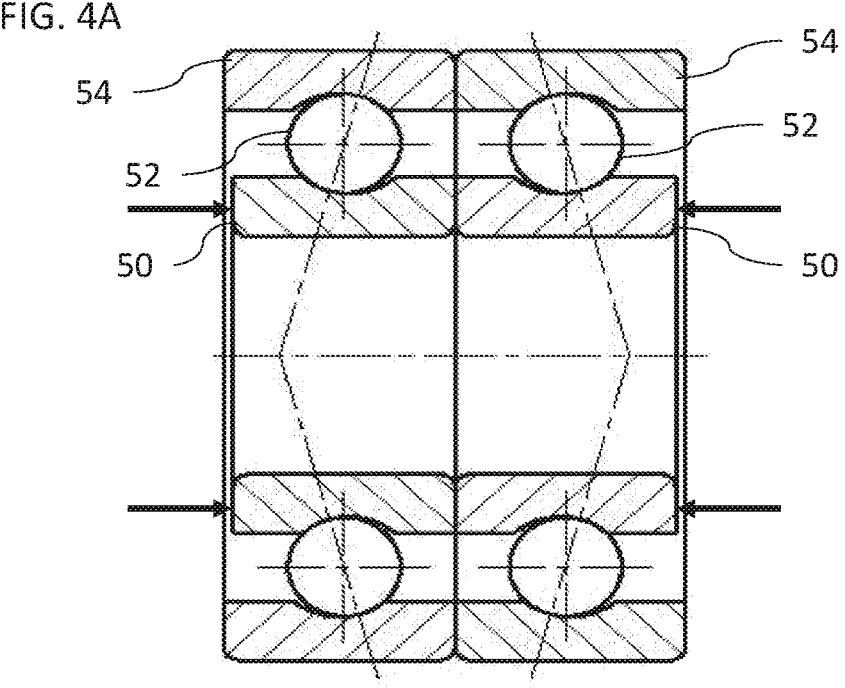
FIGS. 4A and 4B are schematic cross-sectional views taken through loaded duplex bearing assemblies with a back-to-back configuration and a face-to-face configuration, respectively.
Figure 4B:
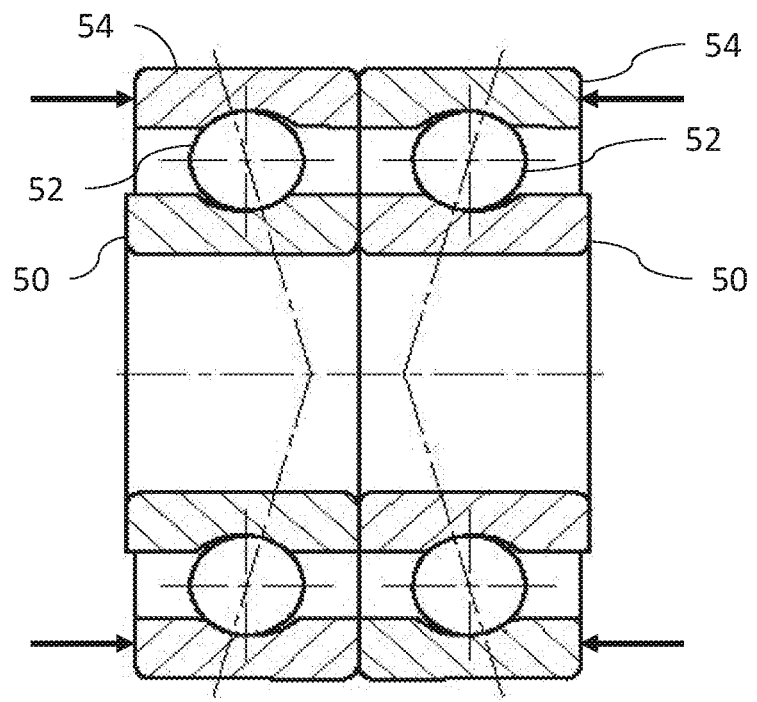
Figure 5:
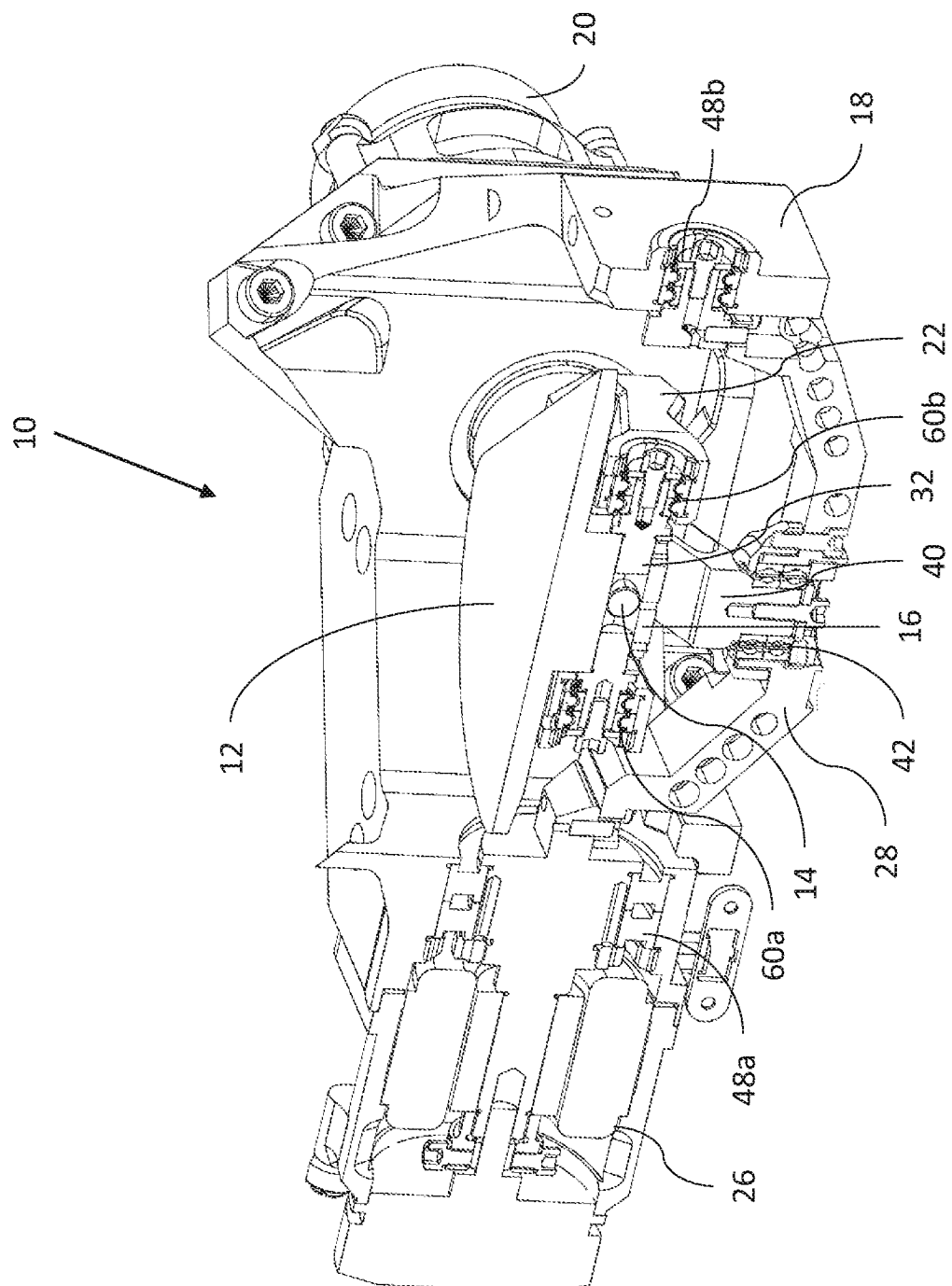
FIG. 5 is a cut-away isometric view of the orienting mechanism of FIG. 1 cut away along the dashed line V in the direction indicated by the associated arrows.
Figure 6:
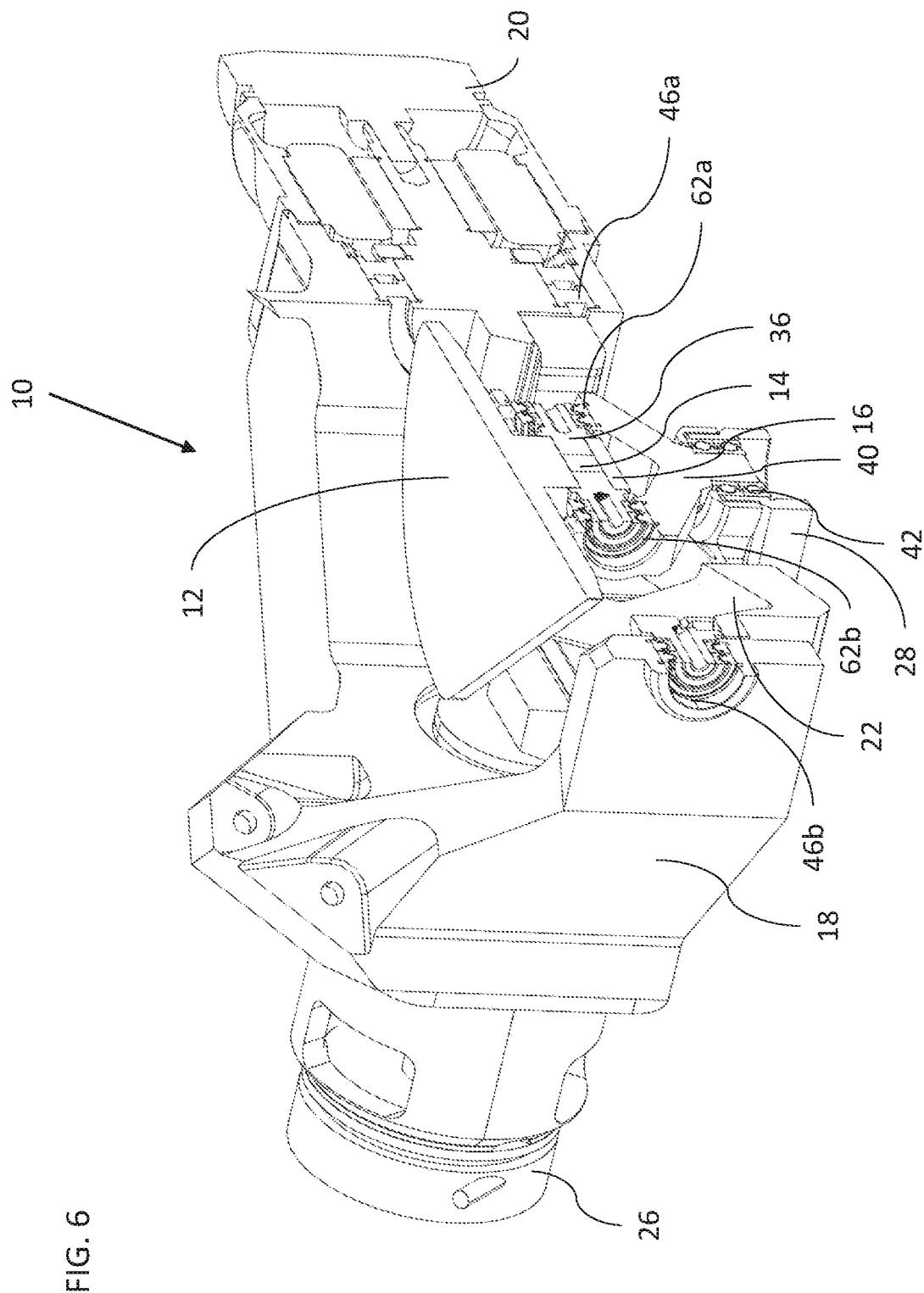
FIG. 6 is a cut-away isometric view of the orienting mechanism of FIG. 1 cut away along the dashed line VI in the direction indicated by the associated arrows.
Figure 7:
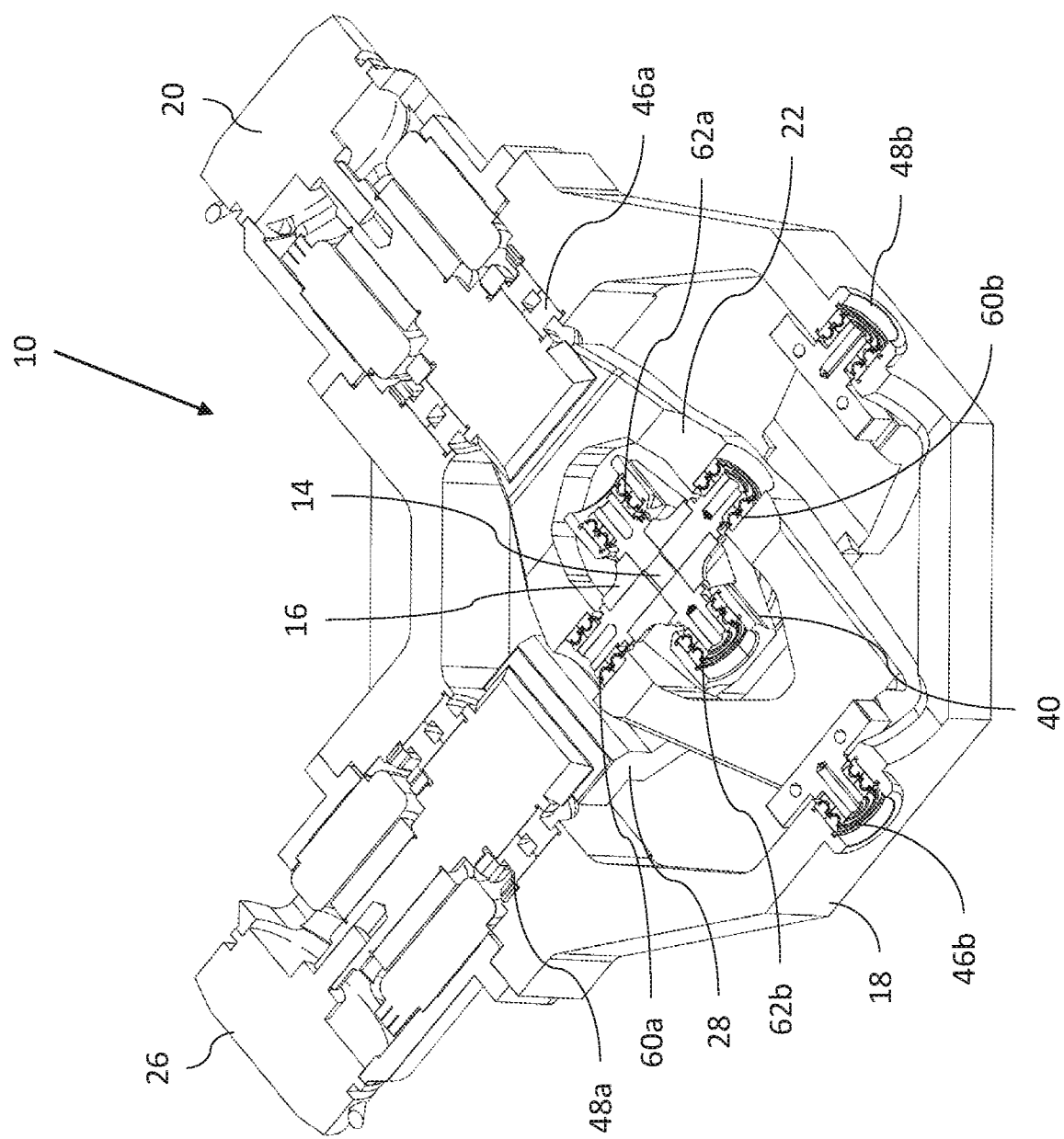
FIG. 7 is a cut-away isometric view of the orienting mechanism of FIG. 1 cut away along the dashed line VII in the direction indicated by the associated arrows.

In certain particularly preferred implementations, the first set of two bearing assemblies 46a and 46b and the second set of two bearing assemblies 48a and 48b are implemented as loaded duplex bearing assemblies. Loaded duplex bearing assemblies are assemblies in which a pair of bearing rings are tightened (preloaded) together axially in a way that reduces tolerances and play to achieve enhanced precision. Such assemblies may be of two types, distinguished by the way in which the bearing rings are loaded and the resulting mechanical properties, as illustrated schematically in FIGS. 4A and 4B. In the configuration of FIG. 4A, referred to as "back-to-back," the inner rings 50 are clamped together (represented schematically by arrows) so that the contact points between the bearings 52 and the inner rings are axially spaced apart, while the contact points with the outer rings 54 are closer together. In the configuration of FIG. 4B, referred to as "face-to-face," the outer rings are clamped together, resulting in contact points between the bearing and the outer rings that are axially spaced apart, while the contact points with the inner rings are closer together. Both configurations offer high precision with minimal play, but the contact region profiles (highlighted by dash-dot lines) of the back-to-back configuration provide greatly enhanced pivotal rigidity compared to the roughly radial contact region profiles of the face-to-face configuration, which offers more elasticity.

According to certain preferred implementations of the present invention, the high-rigidity properties of back-to-back loaded duplex bearing assemblies are used to advantage to enhance rigidity of the orienting mechanism by implementing at least one of the first set of two bearing assemblies 46a and 46b as a back-to-back loaded duplex bearing assembly, and at least one of the second set of two bearing assemblies 48a and 48b as a back-to-back loaded duplex bearing assembly. While in some cases it may be advantageous to implement both bearing assemblies on each axis as back-to-back assemblies, it has been found in some cases that this may make assembly of the mechanism more difficult. It may therefore be preferred in some cases to implement one of the first set of two bearing assemblies 46a and 46b as a back-to-back loaded duplex bearing assembly and the other as a face-to-face loaded duplex bearing assembly, and similarly to implement one of the second set of two bearing assemblies 48a and 48b as a back-to-back loaded duplex bearing assembly and the other as a face-to-face loaded duplex bearing assembly. In one non-limiting preferred example, the back-to-back loaded duplex bearing assembly is implemented as the motor-side bearings 46a and 48a, although the reverse arrangement is also possible. The diameter of the bearing assemblies may differ within each set, such as for the use of larger diameter bearing assemblies adjacent to the motor and smaller diameter assemblies at the distal end of each drive arm, as illustrated here.

In particularly preferred implementations, some or all of the aforementioned features of bilateral support, use of duplex bearing assemblies, and the enhanced rigidity of at least one back-to-back loaded duplex bearing assembly are used also for the support of payload support 16 for rotation about first support rotation axis 34 and second support rotation axis 38. In order to provide bilateral support for first support rotation axis 34, first drive arm 22 preferably has a bifurcated medial portion 56 defining a medial opening 58, within which payload support 16 is mounted (FIG. 3B). The first support rotary joint is preferably implemented using a third set of two bearing assemblies 60a and 60b, located on opposite sides of the center of rotation 14, supporting the payload support 16 bilaterally from bifurcated medial portion 56 of first drive arm 22. Coupling 40 preferably extends from second drive arm 28 through the medial opening 58 in first drive arm 22, as see in FIG. 3A.

In order to provide bilateral support for the second support rotary joint (second support rotation axis 38), an end portion of coupling 40 is preferably bifurcated, forming a Y-shape coupling. The second support rotary joint is preferably implemented using a fourth set of two bearing assemblies 62a and 62b located on opposite sides of the center of rotation 14 supporting payload support 16 bilaterally from the bifurcated end portion of the coupling 40.

Here too, third set of two bearing assemblies 60a and 60b and fourth set of two bearing assemblies 62a and 62b are preferably all implemented as loaded duplex bearing assemblies, and in some cases, with at least one of the bearing assemblies of each set implemented as a back-to-back loaded duplex bearing assembly.

Turning now to the coupling rotary joint 42, this is also preferably implemented using a loaded duplex bearing assembly. Additionally, it has been found advantageous to provide adjustability of an axial position of coupling 40 along the coupling rotation axis 44 in order to accommodate manufacturing and assembly tolerances which might otherwise result in non-alignment of the various rotation axes. This adjustment may advantageously be implemented by mounting an outer cup of the bearing assembly in threaded engagement with a complementary threaded bore in second drive arm 28, thereby allowing manual (or automated) adjustment of the coupling axial position along the coupling rotation axis. This adjustment can be performed before tightening of the loading on the loaded duplex bearing assembly. Tightening of the loading then preferably serves to lock the adjustment in place.

The range of motion of the orienting mechanism as illustrated is typically about ±20 degrees about each motor axis, but this can be modified according to the requirements of each application.

Each drive motor 20 and 26 is preferably integrated with a corresponding encoder which provides accurate feedback of motor position. The types of motor and encoder are chosen according to the particular performance and precision requirements of each application, as is known in the art.

It will be appreciated that the above descriptions are intended only to serve as examples, and that many other embodiments are possible within the scope of the present invention as defined in the appended claims.

What is claimed is:

1. A spherical orienting mechanism for orienting a payload relative to two axes of rotation about a center of rotation, the mechanism comprising:
   (a) a payload support located at the center of rotation;
   (b) a frame at least partially encompassing said payload support;
   (c) a first drive assembly comprising:
      (i) a first motor deployed in fixed relation to said frame, and
      (ii) a first drive arm deployed so as to be driven by said first motor to rotate about a first drive axis aligned with the center of rotation, said payload support being supported relative to said first drive arm by a first support rotary joint, said first support rotary joint defining a first support rotation axis that is transverse to said first drive axis and aligned with the center of rotation;

(d) a second drive assembly comprising:
(i) a second motor deployed in fixed relation to said frame, and
(ii) a second drive arm deployed so as to be driven by said second motor to rotate about a second drive axis, transverse to said first drive axis and aligned with the center of rotation, said second drive arm being linked to said payload support by a coupling linked to said second drive arm via a coupling rotary joint and to said payload support via a second support rotary joint, said coupling rotary joint defining a coupling rotation axis that is transverse to said second drive axis and aligned with the center of rotation, said second support rotary joint defining a second support rotation axis that is transverse to said coupling rotation axis and to said first support rotation axis, wherein said first drive arm is supported relative to said frame for rotation about said first drive axis by a first set of two bearing assemblies located on opposite sides of said center of rotation, and wherein said second drive arm is supported relative to said frame for rotation about said second drive axis by a second set of two bearing assemblies located on opposite sides of said center of rotation.

2. The mechanism of claim 1, wherein said first frame is a closed frame encompassing said payload support.

3. The mechanism of claim 2, wherein said bearing assemblies of said first and second sets of bearing assemblies are implemented as loaded duplex bearing assemblies.

4. The mechanism of claim 3, wherein at least one of said first set of two bearing assemblies is a back-to-back loaded duplex bearing assembly, and at least one of said second set of two bearing assemblies is a back-to-back loaded duplex bearing assembly.

5. The mechanism of claim 3, wherein one of said first set of two bearing assemblies is a back-to-back loaded duplex bearing assembly and another of said first set of two bearing assemblies is a face-to-face loaded duplex bearing assembly, and wherein one of said second set of two bearing assemblies is a back-to-back loaded duplex bearing assembly and another of said second set of two bearing assemblies is a face-to-face loaded duplex bearing assembly.

6. The mechanism of claim 1, wherein said bearing assemblies of said first and second sets of bearing assemblies are implemented as loaded duplex bearing assemblies.

7. The mechanism of claim 6, wherein at least one of said first set of two bearing assemblies is a back-to-back loaded duplex bearing assembly, and at least one of said second set of two bearing assemblies is a back-to-back loaded duplex bearing assembly.

8. The mechanism of claim 6, wherein one of said first set of two bearing assemblies is a back-to-back loaded duplex bearing assembly and another of said first set of two bearing assemblies is a face-to-face loaded duplex bearing assembly, and wherein one of said second set of two bearing assemblies is a back-to-back loaded duplex bearing assembly and another of said second set of two bearing assemblies is a face-to-face loaded duplex bearing assembly.

9. The mechanism of claim 1, wherein said first drive arm has a bifurcated medial portion defining a medial opening, and wherein said first support rotary joint comprises a third set of two bearing assemblies located on opposite sides of said center of rotation supporting said payload support bilaterally from said bifurcated medial portion of said first drive arm.

10. The mechanism of claim 9, wherein said coupling extends from said second drive arm through said medial opening in said first drive arm.

11. The mechanism of claim 10, wherein an end portion of said coupling is bifurcated, and wherein said second support rotary joint comprises a fourth set of two bearing assemblies located on opposite sides of said center of rotation supporting said payload support bilaterally from said bifurcated end portion of said coupling.

12. The mechanism of claim 11, wherein said bearing assemblies of said third and fourth sets of bearing assemblies are implemented as loaded duplex bearing assemblies.

13. The mechanism of claim 1, wherein said coupling rotary joint is configured to provide adjustability of an axial position of said coupling along said coupling rotation axis.

14. The mechanism of claim 9, wherein said coupling rotary joint is configured to provide adjustability of an axial position of said coupling along said coupling rotation axis.

* * * * *